(No Model.) 2 Sheets—Sheet 1.
M. M. & R. P. MANLY.
M. Manly, admr'x of M. M. Manly, dec'd.
MANUFACTURE OF COILS FOR ELECTRICAL PURPOSES.
No. 247,082. Patented Sept. 13, 1881.
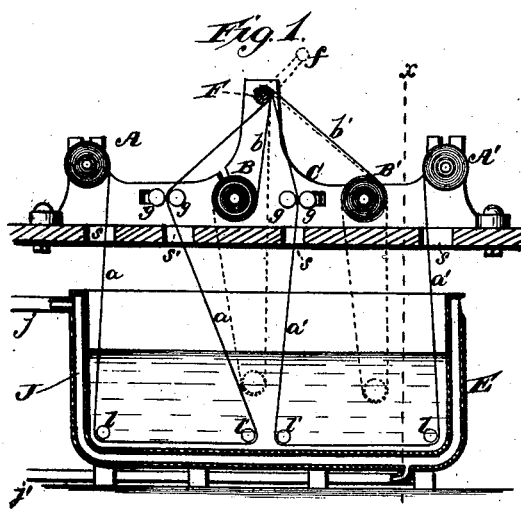
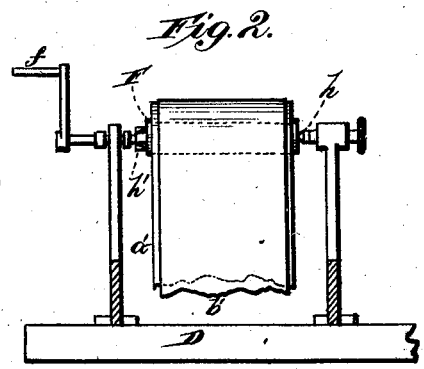
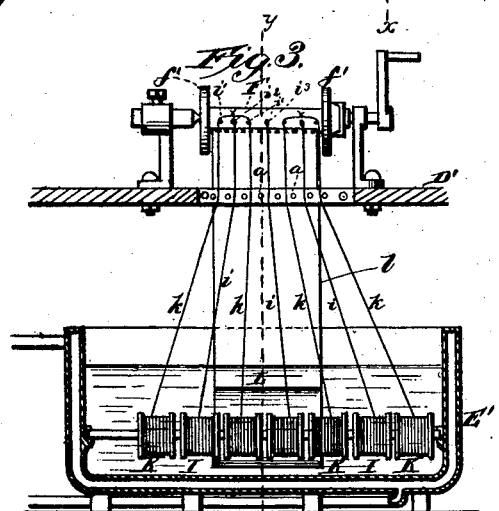
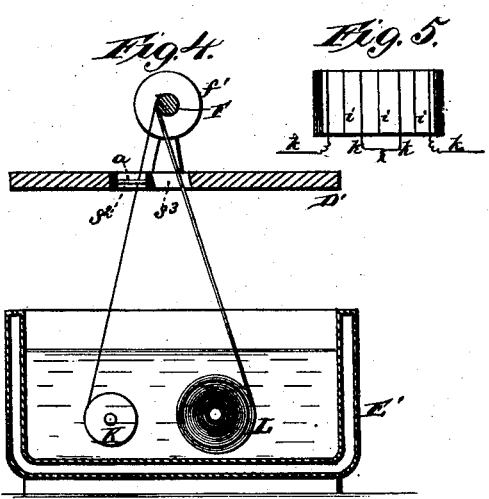
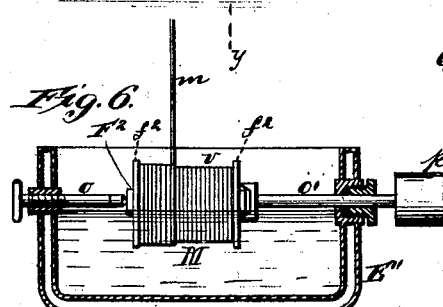
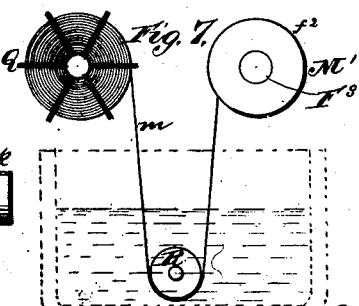
Witnesses.
Robert Erwitt
Harry A. Gullfish
Inventors
M. M. Manly
Robert P. Manly
by Fred W. Royce
Atty.

(No Model.) 2 Sheets—Sheet 2.
M. M. & R. P. MANLY.
M. Manly, admr'x of M. M. Manly, dec'd.
MANUFACTURE OF COILS FOR ELECTRICAL PURPOSES.
No. 247,082. Patented Sept. 13, 1881.
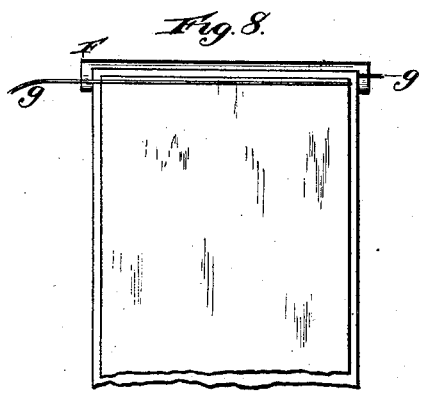
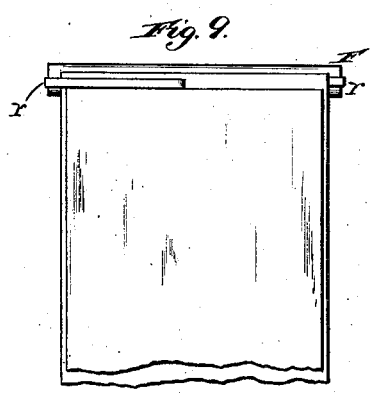
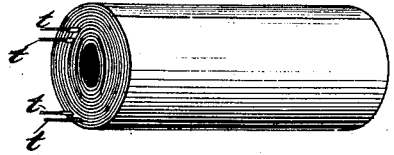
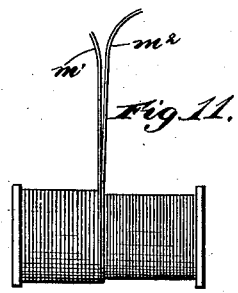
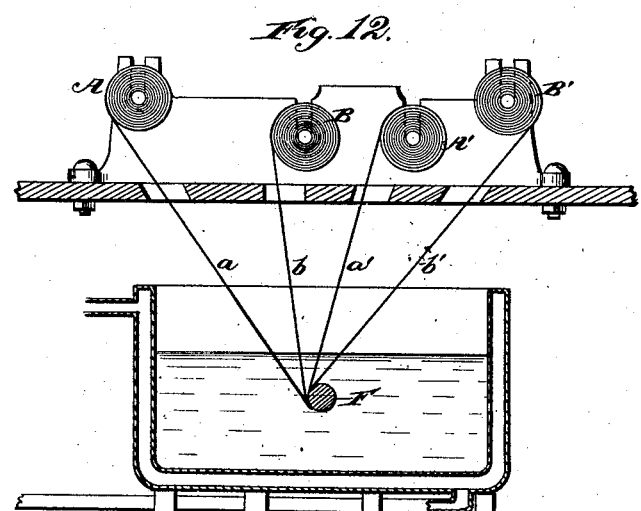
Witnesses.
Robert Everett,
W. B. Hale.
Inventor:
M. M. Manly,
Robert P. Manly,
By Fred W. Royce, atty.

UNITED STATES PATENT OFFICE.

MARCUS M. MANLY AND ROBERT P. MANLY, OF PHILADELPHIA, PENNSYLVANIA, (MARCIA MANLY ADMINISTRATRIX OF MARCUS M. MANLY, DECEASED.)

MANUFACTURE OF COILS FOR ELECTRICAL PURPOSES.

SPECIFICATION forming part of Letters Patent No. 247,082, dated September 13, 1881.

Application filed March 22, 1881. (No model.)

*To all whom it may concern:*

Be it known that we, MARCUS M. MANLY and ROBERT P. MANLY, citizens of the United States, residing at Philadelphia, in the county of Philadelphia and State of Pennsylvania, have invented certain new and useful Improvements in the Manufacture of Coils for Electrical Purposes; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to the coils for coil-condensers, resistance-coils, electro-magnets, and like articles, its object being to cheapen the manufacture of such coils and render them efficient and reliable.

Heretofore condensers have been formed of plates, arranged facing each other, coated with an insulating or dielectric material, and they have also been made of sheets of tin-foil separated by sheets of oil-silk or layers of other dielectric material, both these constructions being expensive in manufacture, from the fact that the metallic plates have to be separately and carefully coated by hand, and the sheets of foil have been cut to about equal size with the sheets of oil-silk, which is itself costly, and then, the foil sheets being connected in pairs, the whole had to be bound together by a suitable casing.

In forming the coils of resistance-coils and electro-magnets the wires have heretofore been covered with cotton, silk, or other insulating material as a separate operation before being wound into coils.

We have found that when a sheet or strip of tin-foil or a wire is coated with a fused insulating or dielectric material and immediately coiled, the said dielectric or insulating material, on cooling and becoming solid, forms a coating quite efficient for insulating said conductors and keeping the successive spirals and layers of said conductors separated, while the ease and rapidity with which the coating and coiling are simultaneously performed, as hereinafter fully described, renders the manufacture of coils for electrical purposes vastly cheaper than heretofore.

Our invention consists in a process for coating the conductors and simultaneously winding them in coils, as hereinafter fully described, with various modifications for special purposes, and is clearly pointed out in the appended claims.

In the accompanying drawings, Figure 1 is a vertical section of an apparatus constructed especially for winding coil-condensers, the reels and strips of foil and paper being shown in position as when being wound upon the core. Fig. 2 is a transverse section of the apparatus, taken on line *x x* of Fig. 1. Fig. 3 is a vertical longitudinal section of an apparatus for winding resistance-coils, the wires and insulating-paper being shown in position as attached to the core at the commencement of winding. Fig. 4 is a transverse section of the apparatus, on line *y y* of Fig. 3. Fig. 5 is a side view of a resistance-coil after the winding is completed, the outer layer of paper being omitted to show the mode of joining the outer ends of the intermediate wires. But few wires are shown in Figs. 3 and 5, in order to clearly illustrate their arrangement, a much larger number, separated only by intervening threads of cotton, being used in practice. Fig. 6 is a vertical section of an apparatus for winding the helices or coils of electro-magnets. Fig. 7 is a vertical transverse section of a modified apparatus for the same purpose. Fig. 8 illustrates the manner of arranging the inner terminals of the foil strips. Fig. 9 shows another manner of arranging said terminals. Fig. 10 is a view of a coil having different capacities and provided with intermediate terminals. Fig. 11 illustrates the manner of winding an electro-magnet with alternate coils of wire and fibrous threads. Fig. 12 is a vertical section of a machine in which a condenser-coil is wound within a fused dielectric.

Referring to Fig. 1, the letters A and A' designate rolls of paper of suitable width, depending upon the length of the condenser to be made; and B and B' indicate rolls of tin-foil somewhat narrower than the paper, as shown in Fig. 2, where $a'$ is the paper and $b'$ the tin-foil, in order that the edges of the foil may not come in contact when the strips of foil and paper are wound together upon the core or stock F. The rolls of paper and foil are respectively wound on suitable spindles, the ends of which are journaled in bearings formed in vertical plates C, secured to the top of a table, D.

The letter E indicates a metallic vessel or tank surrounded by a steam-jacket, J, provided with pipes $j$ and $j'$, by means of which a circulation of steam may be maintained in said jacket. In the vessel E is to be placed a suitable dielectric composition or substance which is hard at ordinary atmospheric temperatures, but fusible by steam heat—such, for instance, as a compound of beeswax and rosin in about equal proportions.

The operation of winding a condenser-coil with this apparatus is as follows: The pipe $j$ having been connected with a suitable steam-generator and circulation of steam established in the steam-jacket J, the dielectric material is fused in the vessel E. The strip of paper $a$ is then led from the roll A down through an opening, $s$, in the top of the table, down through the molten dielectric in the vessel E, under guide-rollers $l\ l'$, mounted in suitable bearings in the vessel near its bottom, and then upward through another slot, $s'$, in the table, between squeezing-rollers $g\ g$, (one of which should be mounted in a spring-bearing in the ordinary manner, giving it a light pressure toward the other,) and thence to the core or wooden stock F, to which its end should be secured by the adhesiveness of the fused dielectric with which it is coated, or in any other suitable manner. The core F is simply a cylinder of wood, and is supported by having one end centered on a conical-tipped bearing-screw, $h$, and its other end held by a claw or dog, $h'$, on the shaft of the crank $f$, in a manner similar to the mounting of articles in lathes. The end of the first strip of paper, $a$, having been secured to the wooden core, the strip of tin-foil $b$ should be led direct from the roll B and attached to the outside of the paper $a$ a little back of its edge, and a strip of paper or a copper wire should be secured along the end edge of this foil strip and extend lengthwise of the core beyond the margin of the paper on one side of the paper strip, as shown at $q$, Fig. 8, this being to afford means of making connection of any desired apparatus with the strip when the coil is completed; or a slit may be cut nearly across the foil strip near its end, and the severed portion folded over the unsevered portion, as shown at $r$, Fig. 9, so as to project beyond its edge, and thus form a projecting terminal. This foil strip having been secured, the strip of paper $a'$ is led down through the dielectric and to the wooden core by a path similar to that of the first paper strip, but differently located, as shown, and the end of this strip $a'$ should lap a little beyond the end edge of the first strip preferably, and be similarly secured.

Finally, the strip of tin-foil $b'$ is led directly from the roll B$'$ to the core and secured outside of the last paper strip, a copper strip or wire or other electric terminal leading from it the same as from the first foil strip $b$, but in the opposite direction.

Care should be taken that the paper and foil strips are all secured to the core, so that they will wind straight, and on turning the crank $f$ they will all be wound together upon the core, layers of paper alternating with and overlapping the edges of the layers of foil, and as the paper has been thoroughly saturated with the dielectric in its passage through the vessel E, the layers of foil, as well as the entire strips of the same, will be thoroughly insulated from each other, but capable of induction one upon the other.

The condenser may have any length of strips desired, and the outer ends of the paper strips should be continued a layer or more beyond the outer ends of the foil strips. The outer ends of the foil strips may be folded upon wires or metal strips extending laterally beyond the paper, or may be cut and folded, as before described, so that the outer end of each foil strip may be connected to its inner end, if desired. The condenser-coil, having been thus wound, may be allowed to cool, and be mounted for use in any desired manner.

In order to construct the condenser to have several capacities, only one of the foil strips should be continuous, the other being divided at intervals and its divisions provided with accessible terminals, as shown at $t\ t\ t\ t$, Fig. 10, these terminals being wires, which are connected, as stated, to the separated ends of the sectional foil strips, any of said terminals being connected together when desired.

The dielectric substance should be kept in such a state of fusion as to thoroughly saturate the paper and drain off readily, so that there will be no dripping after the strips pass the squeezing-rollers.

Both the foil and paper strips may be passed through the fused dielectric, the foil strips being led down under rollers mounted in the tank, as shown in dotted lines, Fig. 1.

Instead of mounting the core F in bearings above the molten dielectric, as shown, it may be mounted in the vessel E to revolve in the dielectric, as shown in Fig. 12, and the strips of foil and paper may lead to it from rolls directly above, the end accomplished being the same.

The office of the paper being simply to support the dielectric in contact with the foil, it may be dispensed with and the foil strips passed through the dielectric, a sufficient speed of winding being maintained to allow the coating to assume a proper consistency. In such case the squeezing-rollers may also be dispensed with, and one of the foil strips should, preferably, be narrower than the other.

In Fig. 3, which illustrates an apparatus for applying our process to the manufacture of resistance-coils, the letter F$'$ indicates a cylinder of non-conducting material to form the core of the coil. This cylinder or core is provided with heads $f' f'$, and is mounted for winding, substantially as is the core F in Fig. 1, the crank-shaft and center bearing being mounted in suitable standards rising from the table D'. In the table, under the position of the core, are formed two slots, $s^2$ and $s^3$, the former having extending transversely between its side walls a series of pins, $a$, at proper distances apart to suitably separate the wires and threads to be wound upon the core, as explained further along. The other slot, $s^3$, is clear for the passage of a strip of paper of suitable width, which is to separate the layers of wires and threads.

In the vessel E', below the table D', a number of spools, I and K, are fixed upon a shaft having its bearings in or secured to the wall of the vessel. These spools are alternately of wire and cotton thread, preferably of about the same size as the wire, the first and last spools holding wire. Mounted also in the vessel E', on a suitably-journaled spindle, is a roll, L, of paper, nearly or quite the same width as the core F' between its heads.

In carrying out the process, the spools and roll of paper being in position, as shown, a suitable fusible insulating substance or compound is melted in the vessel E', as heretofore described, or may be melted elsewhere and poured into said vessel, the circulation of steam in the jacket afterward keeping it at a proper consistency. The level of the fused material should be above the spools and roll of paper, preferably, more being added as the level falls. The insulating material being placed in the vessel, preferably melted, the outer ends of the wires $k$ of the first and third wire-spools K are spliced together and looped over two pins, $i'$ $i'$, in the core, as shown, these pins being a proper distance apart to admit another pin, $i''$, between them, to which is secured the end of the thread $i$ from the first thread-spool, I.

We have shown the two joined wires secured by two pins and the thread by an intermediate pin merely for clearness of illustration; but in practice we secure the pair of wires and intermediate thread by a single pin. The thread from the second thread-spool is then secured to pin $i^3$ by itself, and the second pair of wires and intermediate thread being secured the same as the first, and so on. In practice the alternating wires and threads touch each other, and the heads of the attaching-pins should, after having the wires and threads secured to them, be sunk flush with the surface of the core. This much being done, the paper strip $l$ from the roll L has its end attached to the core under the wires and threads, it may be by the adhesiveness of the material with which it is coated; but on a partial turn of the core the wires and threads will hold it. Care should be taken that initial portions of the wires, threads, and paper are properly coated and saturated, respectively, with the insulating material, and the winding may then proceed by turning the crank in such direction that the wires and threads will always be uppermost, so that they may be kept under observation. The coil having been wound to proper size, the wires and threads are cut, and the ends of the second and third wires $k$ are then joined, as shown in Fig. 5, the ends of the first and last wires being left free as coil-terminals. If there are more wires, the fourth and fifth are joined, and so on. The ends of the threads should extend somewhat beyond the ends of the wires in order to guard against wire contacts, and the paper should be left of sufficient length to wrap two or three times around the coil after the wires are joined, the terminal wires only being left projecting. The coil, completed, is composed of wound layers of wires and intermediate threads, separated by layers of paper, the saturation of the threads and paper with the insulating material effecting a proper insulation of the wires.

From the manner in which the wires are connected together it will be seen that a current of electricity traversing the coil flows alternately in opposite directions, and thus the inductions of the spirals or layers one upon another is prevented.

If it should be found advantageous, the coil might be wound in the insulating material and the spools and roll of paper be located above or outside the vessel E and suitably guided to the core.

In Fig. 6, which illustrates a mode and apparatus for winding the helix of an electro-magnet, the metallic core $F^2$ is held edgewise between the center pin, $o$, and the rotary shaft O', which turns in a suitable bearing formed in the wall of the vessel E'', its outwardly-projecting end being provided with a belt-pulley, $p$, by which power may be applied.

The core is provided with the usual hard-rubber (or other suitable material) heads $f^2$.

The level of the fused insulating material should be such at the start that the core will revolve partially within it, and should be kept at such a point that a wire, $m$, being wound upon the core will always pass into and be thoroughly coated with the composition before assuming spiral form in the helix.

The core should have a layer or two of stout paper wound upon it before the winding of the wire begins, and the end of the wire being secured by passing through a small hole close to the core in one of the heads, the winding may proceed, the wire being laid in successive layers of close spirals and insulated by the coating of insulating material which it receives.

The wire may be guided by hand or an automatic winding-guide, such as are commonly used, and said wire, before being wound upon the core, may be naked or covered with cotton, paper, or other fibrous material; or a fibrous thread may be wound with the wire, as shown in Fig. 11, in which the letter $m'$ designates the wire, and $m^2$ the fibrous thread, so that each layer of the helix will be composed of alternating spirals of thread and wire.

In a modified form of apparatus shown in Fig. 7, the wire $m$ is led from a reel, Q, down under a guide-roller, R, below the level of the fused insulating material, and thence up to the core $F^3$ for a helix, M', the core being suitably mounted for winding above the vessel.

In winding the several kinds of coils outside of the insulating or dielectric material, we may direct upon the conductors and paper or threads either a warm or cold blast of air, as desired, in order to keep the material with which they are respectively coated and saturated in such condition as to readily wind without cracking, and not to be squeezed off the conductors.

In winding coils within the fused insulating or dielectric material the latter should be of a thicker consistency than when winding outside.

We do not limit ourselves to any particular fusible insulating or dielectric material, but find quite suitable a compound composed of beeswax and rosin.

After any kind of coil is wound by our process and its parts properly secured, it should, preferably, but not necessarily, be immersed bodily in a bath of the insulating or dielectric material, and so left for an hour or two, so that all air-pockets or other vacant spaces may be filled up.

Having now described our invention, we claim—

1. The method of manufacturing coils for electrical purposes, substantially as herein described, the same consisting in winding upon a core alternate parallel metallic and non-metallic strips or strands, the latter being passed through a fused dielectric substance and saturated therewith before being wound, whereby the metallic strips are insulated from each other.

2. The method of manufacturing coils for electrical purposes, substantially as herein described, the same consisting in winding upon a core wholly or partially submerged in a fused dielectric material one or more pliant metallic strips or strands.

3. The method of manufacturing coils for electrical purposes, substantially as herein described, the same consisting in winding simultaneously upon a core two or more pliant metallic strips or strands in alternate spirals, and interposing between said alternate spirals a dielectric material.

4. The method of manufacturing coils for electrical purposes, substantially as herein described, the same consisting in winding upon a core two parallel pliant metallic strips or strands and two non-metallic strips or strands, the latter forming alternate spirals with the former and passing through a fused dielectric material before being wound.

5. The method of manufacturing coils for electrical purposes, substantially as herein described, the same consisting in winding simultaneously upon a core wholly or partially submerged in a fused dielectric material one or more metallic strips or strands, and one or more non-metallic strips or strands parallel with the same and forming alternate spirals therewith, passing both the metallic and non-metallic strips or strands, or either, through the said fused dielectric material before winding, whereby a coating or layer of said material is interposed between the metallic spirals, for the purpose set forth.

In testimony whereof, we affix our signatures in presence of two witnesses.

MARCUS M. MANLY.
ROBERT P. MANLY.

Witnesses:
B. S. MANLY,
H. S. STUART.